(12) United States Patent
Grether et al.

(10) Patent No.: US 8,967,099 B2
(45) Date of Patent: Mar. 3, 2015

(54) TWO-STROKE ENGINE

(75) Inventors: Michael Grether, Waiblingen (DE); Niels Kunert, Ottenbach (DE); Tommy Roitsch, Waiblingen (DE); Klaus Geyer, Sulzbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 394 days.

(21) Appl. No.: 13/327,020

(22) Filed: Dec. 15, 2011

(65) Prior Publication Data

US 2012/0152216 A1    Jun. 21, 2012

(30) Foreign Application Priority Data

Dec. 16, 2010   (DE) .......................... 10 2010 054 840

(51) Int. Cl.
*F02B 25/00* (2006.01)
*F02B 25/20* (2006.01)
*F02M 3/14* (2006.01)
(Continued)

(52) U.S. Cl.
CPC .................. *F02B 25/20* (2013.01); *F02M 3/14* (2013.01); *F02M 35/10321* (2013.01); *F02B 25/14* (2013.01); *F02M 3/08* (2013.01); *F02M 29/04* (2013.01); *F02M 33/046* (2013.01); *F02B 2075/025* (2013.01); *F02B 33/04* (2013.01);
(Continued)

(58) Field of Classification Search
CPC ... E02D 7/125; F02B 2075/025; F02B 25/14; F02B 33/04; F02B 61/045; F02F 1/22

USPC ........................................................ 123/65 P
See application file for complete search history.

(56) References Cited

U.S. PATENT DOCUMENTS 5,632,792 A * 5/1997 Haggard .......................... 55/497
7,013,851 B2   3/2006 Prager
(Continued)

FOREIGN PATENT DOCUMENTS

DE   10 2004 009 310 A1   9/2005
JP   2001-295652 A       10/2001

OTHER PUBLICATIONS

Grether; U.S. PTO Office Action, U.S. Appl. No. 13/326,974, Dec. 18, 2013, 12 pgs.
(Continued)

*Primary Examiner* — Lindsay Low
*Assistant Examiner* — Charles Brauch
(74) *Attorney, Agent, or Firm* — Paul D. Strain, Esq.; Strain & Strain PLLC

(57) ABSTRACT

A two stroke engine comprises a cylinder, in which a combustion chamber bounded by a piston is formed, and an intake passage. A carburetor forms a section of the intake passage, within which a throttle element is mounted pivotably, and at least one main fuel opening and at least one idling fuel opening open into the intake passage, which is divided downstream of the carburetor into an air passage and a mixture passage. The idling fuel opening feeds a secondary passage arranged within the mixture passage. In the idling position, the throttle element may be arranged adjacent to the upstream entry opening in the secondary passage, and the throttle element may have an opening which, in the idling position of the throttle element, is arranged in the region of the entry opening and connects the secondary passage to that region of the intake passage located upstream of the throttle element.

11 Claims, 4 Drawing Sheets

(51) Int. Cl.
*F02M 35/10* (2006.01)
*F02B 25/14* (2006.01)
*F02M 3/08* (2006.01)
*F02M 29/04* (2006.01)
*F02M 33/04* (2006.01)
*F02B 75/02* (2006.01)
*F02B 33/04* (2006.01)
*E02D 7/12* (2006.01)
*F02B 61/04* (2006.01)
*F02F 1/22* (2006.01)

(52) U.S. Cl.
CPC ............... *E02D 7/125* (2013.01); *F02B 61/045* (2013.01); *F02F 1/22* (2013.01); *Y02T 10/126* (2013.01)

USPC ....................................................... 123/65 P

(56) References Cited

U.S. PATENT DOCUMENTS

| | | | |
|---|---|---|---|
| 7,258,327 B2 | 8/2007 | Prager | |
| 2007/0272188 A1* | 11/2007 | Geyer et al. | 123/179.16 |
| 2008/0276904 A1* | 11/2008 | Surnilla et al. | 123/406.45 |
| 2009/0188461 A1 | 7/2009 | Kummermehr et al. | |
| 2012/0152217 A1 | 6/2012 | Grether et al. | |

OTHER PUBLICATIONS

Grether; U.S. PTO Office Action, U.S. Appl. No. 13/326,974, Aug. 14, 2014, 15 pgs.

* cited by examiner

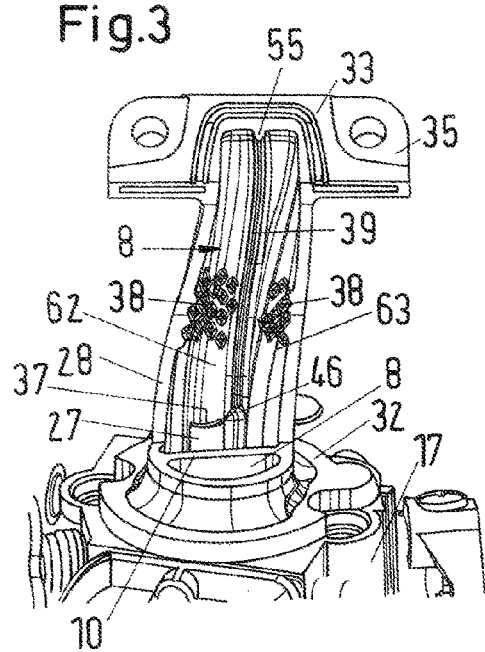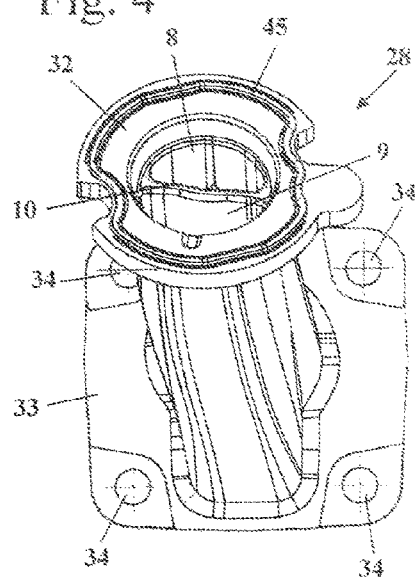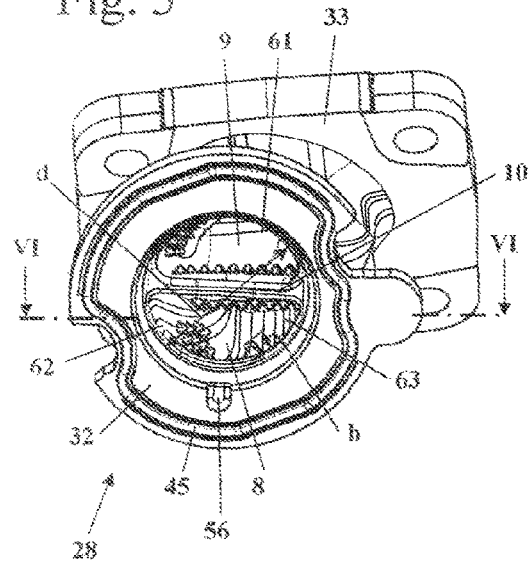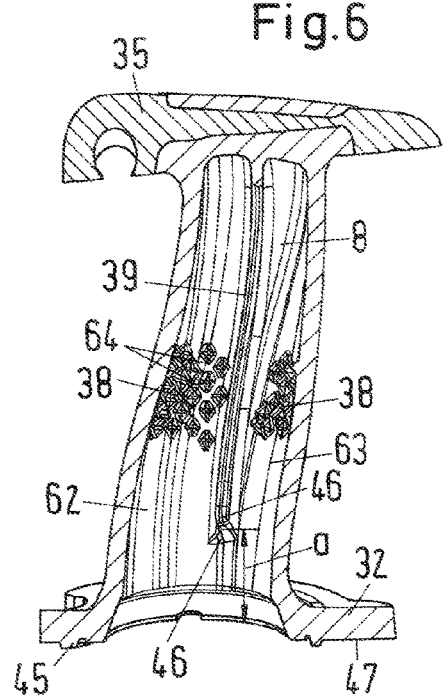

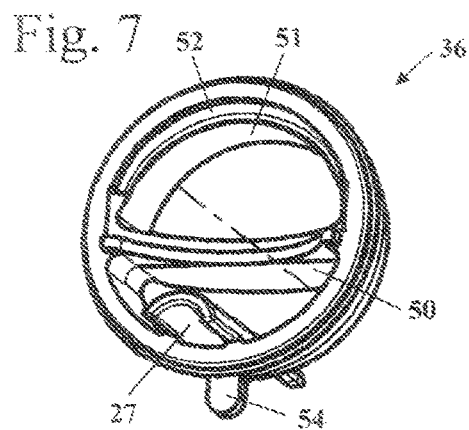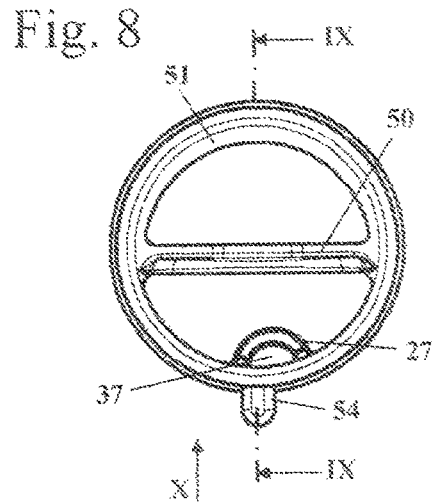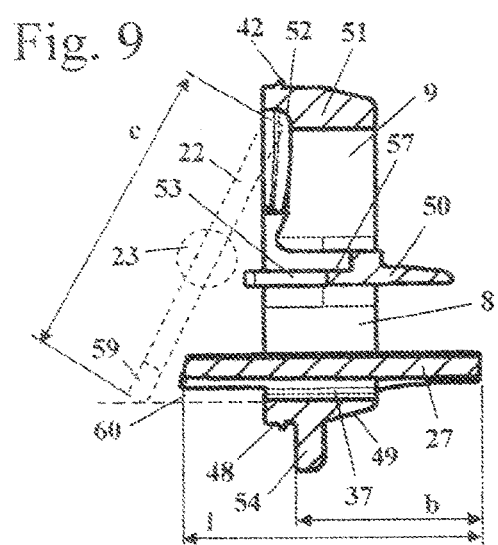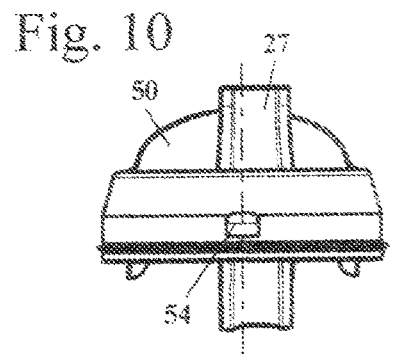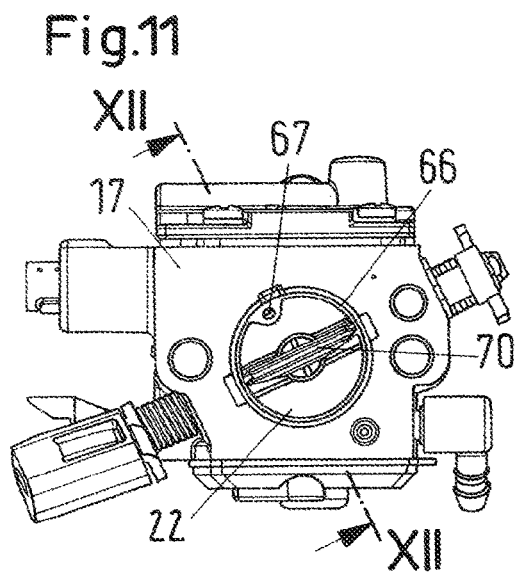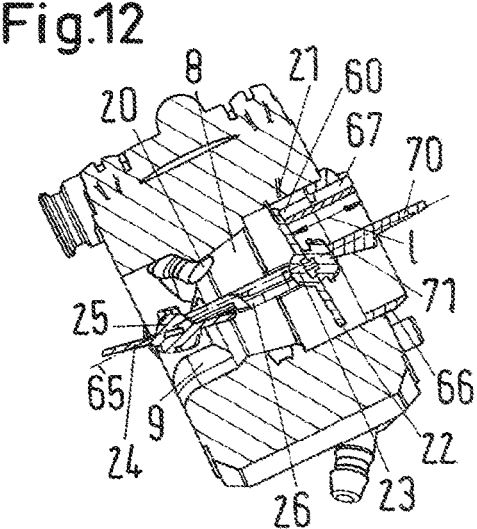

TWO-STROKE ENGINE

CROSS-REFERENCE TO RELATED PATENT APPLICATIONS

This application is based upon and claims the benefit of priority from prior German Patent Application No. 10 2010 054 840.5, filed Dec. 16, 2010 the entire contents of which are incorporated herein by reference in their entirety.

BACKGROUND

The invention relates to a two-stroke engine of the generic type with a cylinder, in which a combustion chamber is formed, wherein the combustion chamber is bounded by a piston which drives a crankshaft mounted rotatably in a crankcase, wherein the crankcase is connected in the region of the lower dead center of the piston via at least one overflow passage to the combustion chamber, with an intake passage, wherein a section of the intake passage is formed in a carburetor, and wherein the intake passage is divided downstream of the carburetor into an air passage and a mixture passage, wherein the mixture passage opens into the crankcase and the air passage supplies combustion air into an overflow passage, wherein, in the carburetor, at least one main fuel opening and at least one idling fuel opening open into the intake passage, wherein a throttle element is mounted pivotably in the carburetor, and wherein the idling fuel opening opens into a secondary passage arranged within the mixture passage, wherein, in the idling position, the throttle element is arranged adjacent to the upstream entry opening in the secondary passage, and wherein the throttle element has an opening which, in the idling position of the throttle element, is arranged in the region of the entry opening and connects the secondary passage to that region of the intake passage which is located upstream of the throttle element.

DE 10 2004 009 310 A1 discloses an intake device for a two-stroke engine, in which, in the carburetor, a shielding element is arranged between the idling fuel opening and an opening in the separating wall, in order to avoid fuel overflowing from the mixture passage into the air passage.

SUMMARY OF THE INVENTION

It is one object of the invention to provide a two-stroke engine of the type discussed above, which has improved running behavior during idling.

This and other objects are achieved by a two-stroke engine with a cylinder, in which a combustion chamber is formed, wherein the combustion chamber is bounded by a piston which drives a crankshaft mounted rotatably in a crankcase, wherein the crankcase is connected in the region of the lower dead center of the piston via at least one overflow passage to the combustion chamber, with an intake passage, wherein a section of the intake passage is formed in a carburetor, and wherein the intake passage is divided downstream of the carburetor into an air passage and a mixture passage, wherein the mixture passage opens into the crankcase and the air passage supplies combustion air into an overflow passage, wherein, in the carburetor, at least one main fuel opening and at least one idling fuel opening open into the intake passage, wherein a throttle element is mounted pivotably in the carburetor, and wherein the idling fuel opening opens into a secondary passage arranged within the mixture passage, wherein, in the idling position, the throttle element is arranged adjacent to the upstream entry opening in the secondary passage, and wherein the throttle element has an opening which, in the idling position of the throttle element, is arranged in the region of the entry opening and connects the secondary passage to that region of the intake passage which is located upstream of the throttle element.

Further objects, features and advantages of the present invention will become apparent from the detailed description of preferred embodiments of the invention which is set forth below, when considered together with the figures of drawing.

BRIEF DESCRIPTION OF THE DRAWINGS

An exemplary embodiment of the invention is explained below with reference to the drawing, in which:

FIG. 3 shows a partially sectioned, perspective illustration of the connecting stub from FIG. 2, FIG. 4 and FIG. 5 show side views of the connecting stub, FIG. 6 shows a section through the connecting stub along the line VI-VI in FIG. 5, FIG. 7 shows a perspective illustration of an intermediate ring, FIG. 8 shows a side view of the intermediate ring, FIG. 9 shows a section along the line IX-IX in FIG. 8, FIG. 10 shows a side view in the direction of the arrow X in FIG. 8, FIG. 11 shows a side view of an exemplary embodiment of a carburetor with an intermediate ring, FIG. 12 shows a section along the line XII-XII in FIG. 11.

DETAILED DESCRIPTION OF PREFERRED EMBODIMENTS

Figure 1:
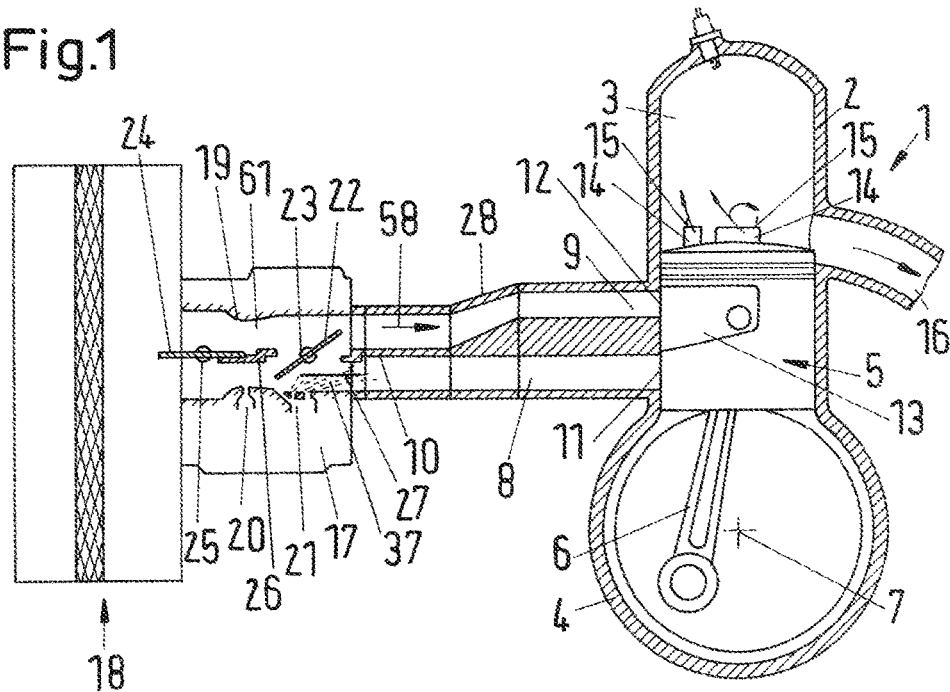
FIG. 1 shows a schematic sectional illustration of a two-stroke engine.

By means of the arrangement of the opening in the throttle valve at the entry opening into the secondary passage, the preparation of the mixture in the secondary passage during idling is improved. At the same time, owing to the fact that the fuel during idling is introduced only into the secondary passage and not into the entire mixture passage, the overflowing of mixture into the air passage is prevented. The secondary passage is advantageously at least partially separated from the mixture passage by a shielding element. In order to achieve a small flow cross section in the secondary passage and thereby to improve the preparation of the mixture, it is provided that the shielding element is of curved design, the concave side of the shielding element bounding the secondary passage. Small flow cross sections of the secondary passage can also be obtained in a simple manner in that the secondary passage is at least partially guided in a bore. The secondary passage advantageously has a throttle. The throttle causes a change in pressure at the fuel opening which opens into the secondary passage. By means of a suitable selection of the throttle, pressure adjustment of the idling fuel opening is possible in a simple manner.

A connecting stub is advantageously arranged downstream of the carburetor, in particular an intermediate ring which bounds the intake passage being arranged between the carburetor and the connecting stub. A simple configuration is produced if at least one section separating the secondary passage from the mixture passage, i.e. a section inwardly bounding the secondary passage, is formed on the intermediate ring. Owing to the fact that the intermediate ring is designed as a separate component, additional bores or shielding elements can easily be integrally formed on the intermediate ring. The intermediate ring is advantageously composed of plastic and is in particular an injection-molded component, and therefore simple production arises. In order to ensure that mixture cannot overflow out of the secondary passage into the air passage due to pulsations in the intake passage, it is provided that a section of the intermediate ring, which section bounds the secondary passage, protrudes into the connecting stub. A simple configuration is produced by the section which bounds the secondary passage being formed on the intermediate ring. The secondary passage is advantageously completely separated from the mixture passage by the intermediate ring, and therefore no additional elements for separating the secondary passage have to be provided on the carburetor and on the connecting stub. The integral formation on the intermediate ring obviates the need for any additional components. The air passage and mixture passage are advantageously separated from each other by a separating wall, a separating wall section being formed on the intermediate ring. The separating wall section formed in the intermediate ring advantageously protrudes both into the carburetor and into the connecting stub. The separating wall section arranged downstream of the throttle shaft as far as the connecting stub is advantageously completely integrally formed on the intermediate ring. This produces a simple configuration with the number of components required being low. The separating wall section on the intermediate ring may overlap here with the separating wall section of the connecting stub in order to obtain sufficient strength. The connecting stub is advantageously composed of an elastic material, such as rubber or elastomeric plastic.

The connecting stub advantageously has a guiding rib running in the direction of flow in the mixture passage. The guiding rib evens out the flow in the connecting stub and avoids vortices and dead spaces which may lead to undesirable accumulations of fuel during operation. The secondary passage in the connecting stub advantageously opens into the mixture passage in a manner offset in the circumferential direction with respect to the guiding rib. The expansion of the mixture in the mixture passage is limited as a result in the longitudinal direction by the guiding rib, and therefore the fuel is substantially guided in a quadrant of the intake passage and is not deposited over the entire circumferential wall of the mixture passage.

The length of the secondary passage is advantageously adjusted for good preparation of the mixture and for avoiding fuel overflowing from the mixture passage into the air passage. In particular, the length of the secondary passage is preferably approximately 25% to approximately 150% of the diameter of the throttle element. A length of the secondary passage of preferably approximately 40% to approximately 100% of the diameter of the throttle element has proven particularly advantageous.

Turning now to the figures, FIG. 1 schematically shows a two-stroke engine 1, as can be used, for example, for driving a tool in hand-guided working implements, such as motor-driven saws, abrasive cutting-off machines, brush cutters or the like. The two-stroke engine 1 has a cylinder 2, in which a combustion chamber 3 is formed. The combustion chamber 3 is bounded on one side by a piston 5 which is mounted such that it moves to and from in the cylinder 2 and, via a connecting rod 6, drives a crankshaft 7, which is mounted rotatably in a crankcase 4. In the lower dead center of the piston 5, the interior of the crankcase 4 is connected to the combustion chamber 3 via overflow passages 14 which open by means of overflow apertures 15 into the combustion chamber 3. An outlet 16 for exhaust leads out of the combustion chamber 3. The two-stroke engine 1 has an intake passage 61 which is connected to an air filter 18 and via which combustion air is sucked up. A section of the intake passage 61 is formed in a carburetor 17. A choke valve 24 with a choke shaft 25, and also, downstream of the choke valve 24, a throttle valve 22 with a throttle shaft 23 are mounted pivotably in the carburetor 17, which is designed in the exemplary embodiment as a diaphragm-type carburetor. Instead of the throttle valve 22, a different throttle element may alternatively be provided, and instead of the choke valve 24, a different choke element may alternatively be provided. Downstream of the throttle valve 22, the intake passage 61 is separated by a separating wall 10 into a mixture passage 8 and an air passage 9. A separating wall section 26 is arranged between the throttle valve 22 and choke valve 24. A main fuel opening 20 and a plurality of idling fuel openings 21 in the carburetor 17 open into the mixture passage 8. The idling fuel openings 21 open into the mixture passage 8 downstream of the main fuel opening 20. In the region of the main fuel opening 20, a Venturi 19 is formed in the intake passage 61.

The mixture passage 8 opens with a mixture inlet 11 on the cylinder 2 and the port is controlled by the piston 5. The air passage 9 opens with an air inlet 12 on the cylinder 2. The piston 5 has one or more piston recesses 13 which connect the air inlet 12 in the region of the upper dead center of the piston 5 to the overflow apertures 15. The air passage 9 may also be divided into two branches which each open with a separate air inlet 12 on the cylinder 2.

During operation, a fuel/air mixture is sucked up into the crankcase 4 via the mixture inlet 11 during the upward stroke of the piston 5. In the region of the upper dead center, largely fuel-free combustion air from the air passage 8 is temporarily stored in the overflow passages 14. During the downward stroke of the piston 5, the fuel/air mixture in the crankcase 4 is compressed and enters the combustion chamber 3 in the region of the lower dead center of the piston 5. In the process, the air temporarily stored in the overflow passages 14 first of all flows into the combustion chamber 3. During the subsequent upward stroke of the piston 5, the fuel/air mixture is once again compressed in the combustion chamber 3 and ignited in the region of the upper dead center of the piston 5. During the subsequent downward stroke of the piston 5, the outlet 16 is opened, and the exhaust gases flow out of the combustion chamber 3 and are expelled by the combustion air flowing in subsequently via the overflow passages 14.

The combustion air flows in the intake passage 61 in a direction of flow 58 from the air filter 18 to the cylinder 2. A connecting stub 28 is arranged between the carburetor 17 and cylinder 2, the connecting stub being composed of an elastic material, for example rubber or an elastomeric plastic, and in which both the mixture passage 8 and the air passage 9 are guided. A shielding element 27 which bounds a secondary passage 37 is arranged in the mixture passage 8 adjacent to the throttle valve 22. At least one idling fuel opening 21 opens into the secondary passage 37. The secondary passage 37 is arranged in the mixture passage 8 and is separated from the latter by the shielding element 27.

Figure 2:
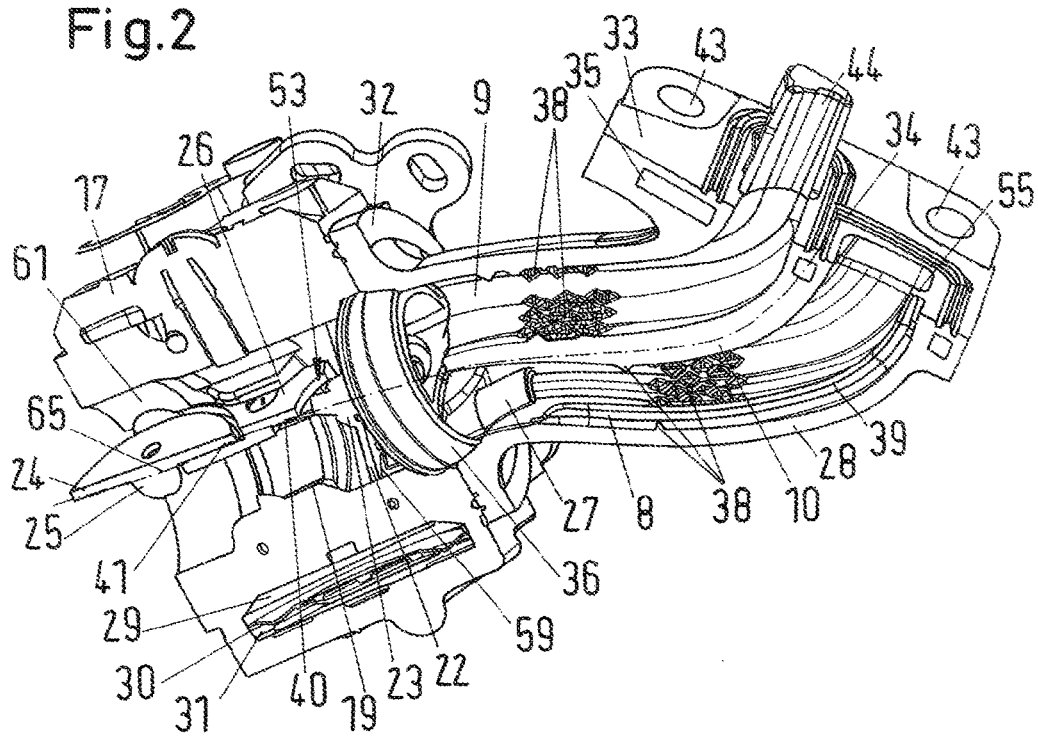
FIG. 2 shows a perspective sectional illustration through a carburetor and connecting stub of the two-stroke engine from FIG. 1.

FIG. 2 shows the configuration in detail. An intermediate ring 36 is arranged between the carburetor 17 and connecting stub 28, the intermediate ring being held in a sealing manner in both the carburetor 17 and in the connecting stub 28. The shielding element 27 is integrally formed on the intermediate ring 36. The intermediate ring 36 is advantageously composed of a dimensionally stable plastic. As FIG. 2 shows, the carburetor 17 has a control chamber 29 which is separated from a compensation chamber 31 via a diaphragm 30. The fuel is metered to the intake passage 61 via the control chamber 29.

As FIG. 2 also shows, the separating wall section 26 has a cutout or recess 41 on the side facing the air passage 9, against which the choke valve 24 bears. In the completely open position, the choke valve 24 adjoins the separating wall section 26 in an approximately flush manner. The separating wall section 26 extends virtually as far as the choke shaft 25. The separating wall section 26 is at a distance from the throttle shaft 23. On the side facing the mixture passage 8, the separating wall section 26 has a cutout or recess 40 which is formed on a narrow border of the separating section 26 and against which the throttle valve 22 bears in the fully open position. An opening 53 is formed between the separating wall section 26 and the throttle shaft 23, via which opening the air passage 9 and the mixture passage 8 are connected to each other in the closed and only partially open position of the throttle valve 22.

The throttle valve 22 has an opening 59, the border of which, in the closed position of the throttle valve 22, is arranged on the shielding element 27 in an approximately flush manner such that combustion air from the region upstream of the throttle valve 22 can enter the secondary passage 37 through the opening 59. As FIG. 2 also shows, the shielding element protrudes both into the carburetor 17 and into the connecting stub 28.

As FIG. 2 shows, the intake passage 61 is separated in the connecting stub 28 by the separating wall 10 into an air passage 9 and mixture passage 8. Both in the air passage 9 and in the mixture passage 8, elevations 38 which are of approximately pyramid-shaped design and at which precipitated fuel can accumulate are arranged in a central region of the connecting stub 8. The fuel is gradually output again by the elevations 38 to the combustion air flowing past, thus avoiding a surge-like overflowing of fuel, for example if the two-stroke engine 1 is pivoted. In this case, the elevations in the air passage 9 are arranged upstream of the elevations in the mixture passage 8. The elevations 38 in the air passage 9 and in the mixture passage 8 do not overlap in the direction of flow 58, and therefore elevations 38 are provided in the mixture passage 8 or in the air passage 9, or no elevations 38 are provided, in every cross section located perpendicularly to the longitudinal center axis 65, but elevations 38 are not provided both in the air passage 9 and in the mixture passage 8 in any cross section.

As FIG. 2 also shows, a guiding rib 39 which runs approximately in the direction of the longitudinal axis 65 of the intake passage is arranged in the mixture passage 8 on the passage side opposite the separating wall 10. In FIGS. 1 and 2, the mixture passage 8 is arranged below the air passage 9. However, in the actual installed position, the mixture passage 8 is advantageously arranged above the air passage 9 with reference to the direction of action of gravity.

The connecting stub 28 has a carburetor connection flange 32, by which the connecting stub is held on the carburetor 17. The carburetor connection flange 32 is held on the end side of the carburetor 17 via clamping elements (not shown). For connection to the cylinder 2, the connecting stub 28 has an engine connection flange 33. The engine connection flange 33 has fastening openings 43 for fastening means, for example screws, with which the engine connection flange 33 can be screwed to the cylinder flange. In order to increase the strength, the engine connection flange 33 has a reinforcing element 35 which is injected into the material of the connecting stub 28. An encircling seal 34, which completely surrounds the mouth openings of the air passage 9 and mixture passage 8 and thus results in good sealing, is sprayed onto the end side. Two stubs 44, of which one is shown in the sectional illustration in FIG. 2, are integrally formed on the connecting stub 28. The stubs 44 protrude beyond the engine connection flange 33 into the cylinder flange and bound the air passage 9. This results in a favorable shaping, and the cylinder flange can simply be removed from the mold during the production of the cylinder 2 by die-casting.

As FIG. 3 shows, the guiding rib 39 has an upstream, carburetor-side end 46 which is offset by the carburetor connection flange 32 into the interior of the connecting stub 28. In addition, the guiding rib 39 has a downstream, engine-side end 55 which lies in the plane of the engine connection flange 33. The carburetor-side end 46 lies approximately level with the end of the shielding element 27.

The guiding rib 39 divides the circumferential wall of the mixture passage 8 into a first circumferential section 62 and a second circumferential section 63. The shielding element 27 is offset in the circumferential direction in relation to the guiding rib 39, and therefore the secondary passage 37 opens at the first circumferential section 62. The guiding rib 39 serves to guide the flow toward the cylinder 2 in the direction of the longitudinal axis 65 of the intake passage. At the same time, the wall film of fuel precipitated in the first circumferential section 62 is prevented from migrating into the second circumferential section 63. This is advantageous in particular during idling. The fuel and the combustion air are guided directly to the cylinder 2 by the guiding rib 39. This prevents the fuel from being distributed throughout the entire connecting stub 28. As a result, fuel cannot pass into dead regions not having an air flow, and therefore an accumulation of fuel and an undefined, surge-like introduction of fuel into the crankcase 4 are avoided. In addition, the guiding rib 39 projecting into the mixture passage 8 evens out the flow in the mixture passage 8 and prevents turbulence in the flow.

As FIG. 4 shows, a seal 45 which is integrally formed on the connecting stub 28 is provided on the carburetor connection flange 32.

FIG. 5 shows the arrangement of the elevations 38. As FIG. 5 shows, elevations 38 are provided both in the air passage 9 and in the mixture passage 8. Elevations 38 are also arranged on both sides of the separating wall 10.

As FIG. 5 shows, the intake passage 61 on the carburetor connection flange 32 has a diameter d. The diameter d is therefore measured at the carburetor-side end 64 of the connecting stub 28. The height h of the guiding rib 39 is significantly smaller than the diameter d of the intake passage 61. The height h is advantageously preferably approximately 5% to approximately 25%, in particular preferably approximately 15% to approximately 20% of the diameter d of the intake passage 61. On the carburetor connection flange 32, the connecting stub 28 has a receptacle into which an element for positionally securing the intermediate ring 36 protrudes.

FIG. 6 shows the configuration of the guiding rib 39 and the arrangement of the elevations 38. The carburetor-side end 46 of the guiding rib 39 is at a distance a from the connection surface 47 of the carburetor connection flange 32. The elevations 38 are arranged in such a manner that passages 64 which each run at an inclination with respect to the longitudinal axis 65 of the intake passage (FIG. 2) and which intersect are formed between the pyramid-shaped elevations 38. As a result, the accumulated fuel can be readily and uniformly conducted away to the combustion air flowing past. At the same time, a relatively large quantity of fuel can be picked up and temporarily stored.

FIGS. 7 to 10 show the configuration of the intermediate ring 36 in detail. The intermediate ring 36 has an outwardly protruding positioning lug 54 which is arranged in the receptacle 56 of the connecting stub 28 (FIG. 5). As the figures show, the shielding element 27 is of curved design, wherein the concave side bounds the secondary passage 37. On the side opposite the shielding element 27, the secondary passage 37 is bounded by the outer wall of the mixture passage 8. This results in a very small flow cross section of the secondary passage 37. The secondary passage 37 is separated from the mixture passage 8 only by the shielding element 27 integrally formed on the intermediate ring 36. The shielding element 27 projects on both sides beyond the annular section of the intermediate ring 36 and projects into the carburetor 17 and the connecting stub 28. As the figures show, a separating wall section 50 is integrally formed on the intermediate ring 36. As FIG. 9 shows, a bearing surface 57 for the throttle valve 22 is formed on the separating wall section 50. On the section protruding into the connecting stub 28, the separating wall section 50 is of flattened design, and therefore the separating wall section 50 bears against the section of the separating wall 10 in the connecting stub 28 and thus leads to an increase in stability.

On the side bordering the air passage 9, the intermediate ring 36 has a thickened portion 51. As shown schematically in FIG. 9, when the throttle valve 22 is slightly open, for example during idling, a gap is formed between the edge of the throttle valve 22 and the intermediate ring 36, through which gap the combustion air flows. That side of the thickened portion 51 which faces the throttle valve 22 is formed in a radius 52, and therefore the air flowing past between the throttle valve 22 and the intermediate ring 26 is directed toward the mixture passage 8. In the process, the combustion air flows through the opening 53 formed between the throttle valve 23 and the separating wall section 50.

As FIG. 9 shows, the intermediate ring 36 has a first fastening section 48 which protrudes into the carburetor 17 and bears an outwardly protruding web 42, with which the fastening section 48 is held in a sealing manner in the carburetor 17. The web 42 is provided to compensate for tolerances and is deformed or sheared off during fitting such that the fastening section 48 always sits in a sealing manner in the carburetor 17 even in the event of unfavorable tolerance pairings. The second fastening section 49, which lies downstream and protrudes into the connecting stub 28, is of partially conically tapering design, and therefore the connecting stub 28 can be pushed in a readily sealing manner onto the intermediate ring 36.

As FIG. 9 shows, the intermediate ring 36 has an insertion length b into the connecting stub 28, which length preferably approximately corresponds to the distance a of the carburetor-side end 46 of the guiding rib 39. The shielding element 27, and therefore the secondary passage 36, has a length 1 which is preferably approximately 25% to approximately 150% of the diameter C of the throttle valve 22. A length 1 of the secondary passage 37 of preferably approximately 40% to approximately 100% of the diameter c of the throttle valve 22 is considered to be particularly advantageous. FIG. 9 also shows the entry opening 60 into the secondary passage 37 at the upstream end of the secondary passage 37. In the idling position of the throttle valve 22 that is shown in FIG. 9, the throttle valve 22 is adjacent to the entry opening 60. In this case, the opening 59 is arranged on the entry opening 60, and therefore combustion air can flow into the secondary passage 37 through the opening 59.

FIGS. 11 to 16 show an exemplary embodiment of a carburetor with an intermediate ring 66 and a connecting stub 72. The same reference numbers as in the preceding figures identify corresponding elements here. As FIGS. 11 and 12 show, a secondary passage 67 bounded by the intermediate ring 66 is formed in the mixture passage 8. The secondary passage 67 has a length 1 which is preferably approximately 25% to approximately 150%, in particular preferably approximately 40% to approximately 100% of the diameter c of the throttle valve 22. A separating wall section 70 is integrally formed on the intermediate ring 66 and extends as far as the throttle shaft 23 such that no noticeable opening between the separating wall section 70 and throttle shaft 23 is formed downstream of the throttle shaft 23. On the side facing the air passage 9, the separating wall section 70 has a bearing surface 71 for the throttle valve 22 which runs at an inclination with respect to the longitudinal axis 65 of the intake passage.

Figure 13:
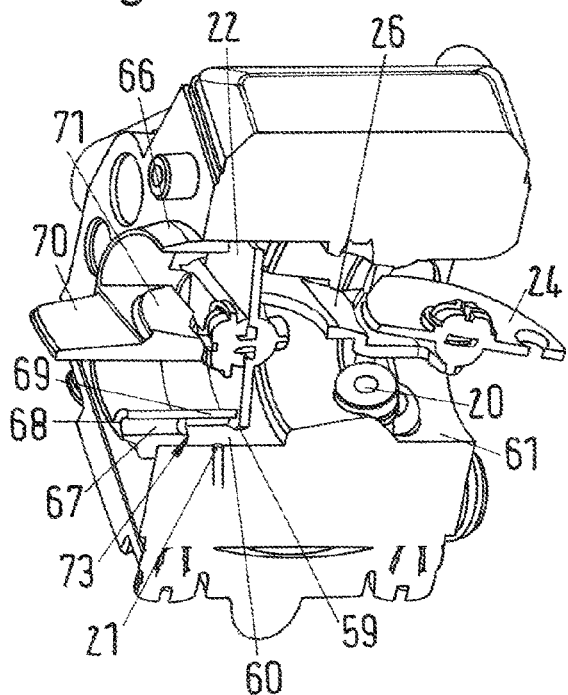
FIG. 13 shows a perspective sectional illustration of the carburetor from FIG. 12, FIG. 14 and FIG. 15 show perspective illustrations of the intermediate ring of the carburetor from FIG. 13.

As FIG. 13 shows, the secondary passage 67 is formed by a shielding element 69 and a bore 68 in the intermediate ring 66. In this case, the upstream section of the secondary passage 67 is bounded by the shielding element 69 and the passage wall of the intake passage 61 and the downstream section is guided in the bore 68. In the idling position, the idling fuel opening 21 (shown schematically) opens into the secondary passage 67 downstream of the throttle valve 22. The opening 59 in the throttle valve 22 is arranged at the entry opening 60 into the secondary passage 67. The main fuel opening 20 opens into the intake passage 61 upstream of the throttle valve 22.

Figure 14:
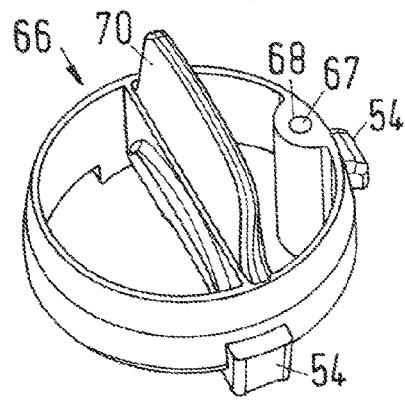
Figure 15:
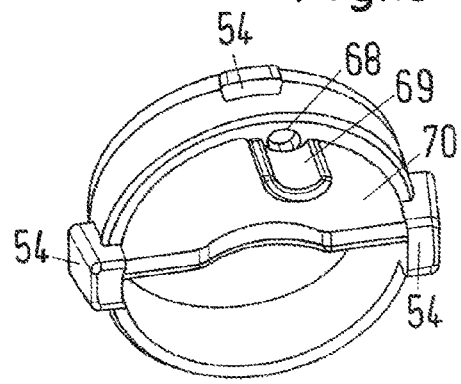

As FIGS. 14 and 15 show, the shielding element 69 merges flush into that section of the intermediate ring 66 which bears the bore 68. At the transition from the shielding element 69 to the bore 68, the flow cross section of the secondary passage 67 is reduced. A bevel is provided here on the bore 68. A throttle 73 is formed by the reducing flow cross section. In addition, the intermediate ring 66 has three differently designed positioning lugs 54.

Figure 16:
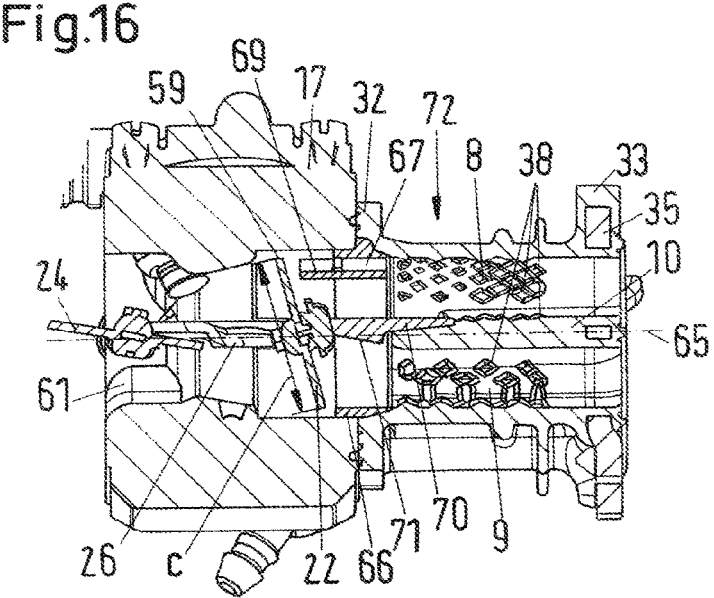
FIG. 16 shows a sectional illustration through the carburetor and connecting stub arranged thereon.

FIG. 16 shows the intermediate ring 66 with a carburetor 17 and connecting stub 72. The connecting stub 72 is designed as a tube connector and has pyramid-shaped elevations 38 on the outer wall and on the separating wall 10 both in the mixture passage 8 and in the air passage 9. The intermediate ring 66 is pushed both into the carburetor 17 and into the connecting stub 72.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

The invention claimed is:

1. A two-stroke engine comprising:
   (i) a cylinder, a combustion chamber, a piston, and a crankcase, and an overflow passage, wherein the combustion chamber is formed in the cylinder, wherein the combustion chamber is bounded by a piston, wherein the piston drives the crankshaft which is mounted rotatably in the crankcase, and wherein the crankcase is connected in the region of the lower dead center of the piston via the overflow passage to the combustion chamber, (ii) a carburetor, an intake passage, a mixture passage, an air passage, a main fuel opening, and an idling fuel opening, wherein a section of the intake passage is formed in the carburetor, wherein the intake passage is divided downstream of the carburetor into the air passage and the mixture passage, wherein the mixture passage opens into the crankcase and the air passage supplies combustion air into the overflow passage, and wherein, in the carburetor, at least one main fuel opening and at least one idling fuel opening open into the intake passage, (iii) a throttle element, a secondary passage, and a shielding element, wherein the throttle element is mounted pivotably in the carburetor, wherein at least one idling fuel opening opens into the secondary passage, wherein the secondary passage is arranged in the mixture passage downstream of the throttle element, wherein at least a portion of the secondary channel extends in the direction of flow of combustion air from the carburetor to the crankcase, wherein at least a portion of the secondary passage is separated from the mixture passage by a shielding element, wherein an upstream opening is formed in the secondary passage in its upstream portion, wherein air flows through the mixture passage from upstream to downstream in relation to the direction of combustion air flow in the mixture channel from the carburetor to the crankcase, wherein, in the idling position, the throttle element is arranged in an approximately flush manner to the upstream entry opening of the secondary passage, wherein the throttle element has an opening which, in the idling position of the throttle element, is arranged in the region of the entry opening of the secondary passage such that combustion air from the region upstream of the throttle valve can enter the secondary passage through the entry opening in the throttle element, and wherein the entry opening in the throttle element connects the secondary passage to the region of the intake passage which is located upstream of the throttle element.

2. The two-stroke engine according to claim 1, wherein the secondary passage is at least partially separated from the mixture passage by a shielding element.

3. The two-stroke engine according to claim 2, wherein the shielding element is of curved design, the concave side of the shielding element bounding the secondary passage.

4. The two-stroke engine according to claim 1, wherein the secondary passage is at least partially guided in a bore.

5. The two-stroke engine according to claim 1, wherein the secondary passage has a throttle, wherein the actuation of the throttle causes a change in pressure at the idling fuel opening which opens into the secondary passage.

6. The two-stroke engine according to claim 1, wherein a connecting stub is arranged downstream of the carburetor, an intermediate ring which bounds the intake passage being arranged between the carburetor and the connecting stub.

7. The two-stroke engine according to claim 6, wherein at least one section separating the secondary passage from the mixture passage is formed on the intermediate ring.

8. The two-stroke engine according to claim 7, wherein a section of the intermediate ring, which section bounds the secondary passage, protrudes into the connecting stub.

9. The two-stroke engine according to claim 6, wherein the air passage and the mixture passage are separated from each other by a separating wall, a separating wall section being formed on the intermediate ring.

10. The two-stroke engine according to claim 6, wherein the connecting stub has a guiding rib running in the direction of flow in the mixture passage, the secondary passage in the connecting stub opening into the mixture passage in a manner offset in the circumferential direction with respect to the guiding rib.

11. The two-stroke engine according to claim 1, wherein the secondary passage has a length which is approximately 25% to approximately 150% of the diameter of the throttle element.

* * * * *